Sept. 16, 1952　　　　M. H. FISHER　　　　2,611,114
CORE TYPE REEL DRIVE
Filed April 15, 1950
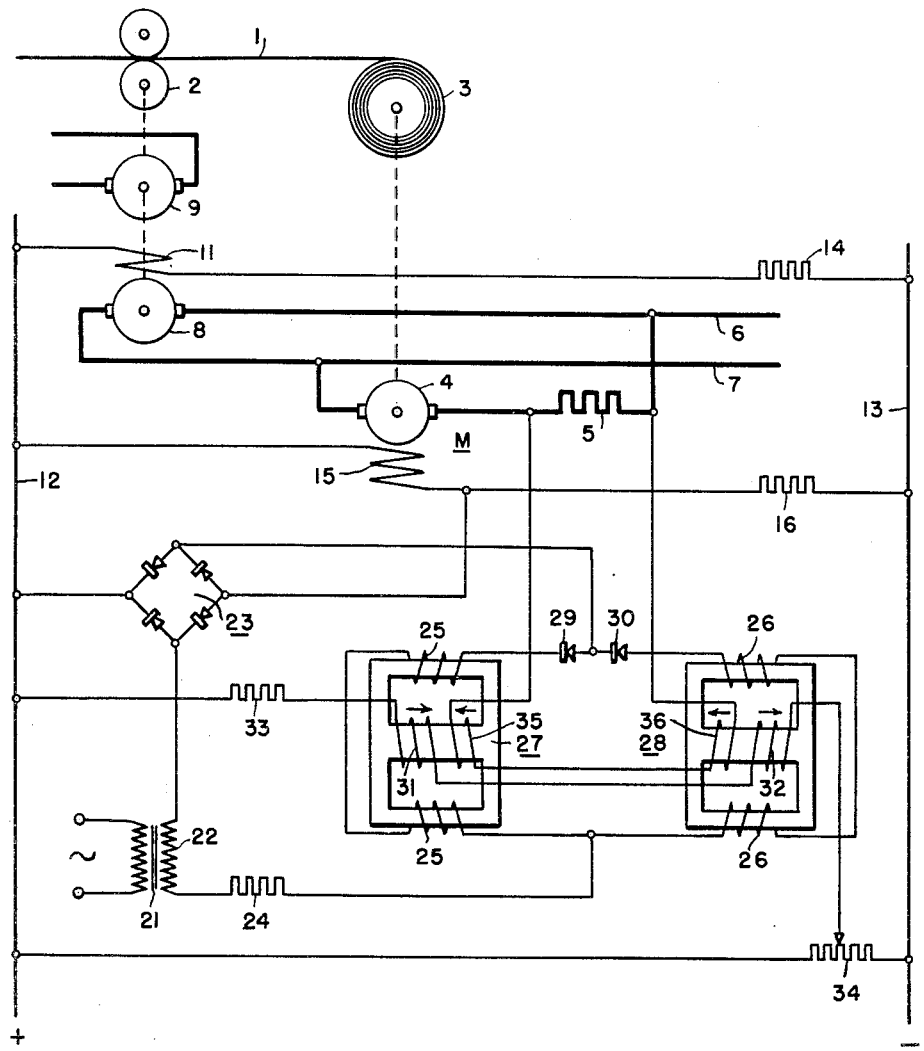
WITNESSES:
INVENTOR
Martin H. Fisher.
BY
ATTORNEY

UNITED STATES PATENT OFFICE 2,611,114

CORE TYPE REEL DRIVE

Martin H. Fisher, Pittsburgh, Pa., assignor to Westinghouse Electric Corporation, East Pittsburgh, Pa., a corporation of Pennsylvania Application April 15, 1950, Serial No. 156,069

5 Claims. (Cl. 318—6)

My invention relates to electric drives for operating a core type reel of web, sheet, or strip material as used, for instance, in paper making machinery, printing presses, textile machinery, foil fabricating equipment, and machinery for the manufacture or fabrication of sheet metal.

The material to be reeled onto or off the motor-driven core is usually supplied to or from the reel at a constant, though often selectively adjustable, linear speed and the reel drive motor is controlled to vary the speed of core revolution in inverse proportion to the increasing or decreasing reel diameter while maintaining the material under substantially constant tension. The conventional drive control systems capable of such a performance have a drive motor with two separately excited field windings. It has also been proposed to permit the use of a normal motor with only one separately excited field winding by exciting this field winding from a source of constant voltage and cumulatively impressing across the field winding another voltage which is controlled by auxiliary rotating machinery to vary in accordance with the armature current of the motor. Such a drive control is disclosed in the M. H. Fisher and V. B. Baker Patent No. 2,495,245, entitled Core Type Reel Drive, assigned to the assignee of the present invention.

It is an object of my invention to provide a core type reel drive which requires for speed regulation and maintenance of constant reeling tension a motor with only one separately excited field winding and which, in distinction from the above-mentioned prior disclosure, performs the desired functions by means of greatly simplified control equipment and with the aid of only static control devices that require neither the use of contactors nor the presence of rotating dynamo-electric machinery.

This and more specific objects of my invention, as well as the means provided by the invention for achieving these objects, will be apparent from the reel drive illustrated by way of example on the appertaining drawing and described in the following.

According to the drawing, the material 1 to be wound passes through fabricating machinery, schematically represented at 2, and moves at an adjusted and substantially constant linear speed toward the reel core 3 which is driven to take up the material under constant tension. The reel core is operated by the armature 4 of a motor M. Armature 4 is energized in series with a low-ohmic resistor 5 from adjustable-voltage buses 6, 7. Preferably, these buses also supply voltage for the processing machinery so that the adjusted bus voltage determines the operating speed of that machinery and hence the linear traveling speed of the material 1. In the illustrated example, the buses 6 and 7 are shown to be energized from a generator 8 which is driven from the motor 9 that also operates the machinery 2. The generator 8 has constant field excitation so that its output voltage, impressed across buses 6, 7 and applied across the armature 4 of reel motor M, is substantially proportional to the linear traveling speed of the material. Consequently, when the linear traveling speed of the material 1 is changed, the voltage impressed on the armature 4 of motor M changes accordingly so that the base value of the reeling speed is automatically adjusted in accordance with the linear speed of the material. The constant excitation for the generator is provided by a field winding 11 which is energized from across buses 12, 13 in series with a resistor 14 which may be adjustable but whose resistance value remains unchanged during the operation of the system.

Excitation for motor M is provided by a single field winding 15 connected across the buses 12 and 13 in series with a resistor 16 which may also be adjustable for calibrating purposes but maintains a constant resistance value once the system is properly adjusted. The buses 12 and 13 thus supply for field winding 15 a constant component of excitation. This component is rated in accordance with the desired maximum speed of the motor M.

The drive system has a magnetic amplifying device energized from an alternating-current supply through a transformer 21. The secondary winding 22 of the transformer is connected in series with the input terminals of a full-wave rectifier 23 and in series with a resistor 24 across the reactance coils 25 and 26 of two reactors 27 and 28, respectively. The two reactance coils 25 and 26 are connected in parallel relation to each other, and two valve elements or half-wave rectifiers 29 and 30 are disposed in the respective parallel circuits of windings 25 and 26. The half-wave rectifiers 29 and 30 have mutually inverse polarities so that one half wave of the alternating current supplied from the transformer secondary 22 passes through one reactance coil 25 while the next following half wave of the opposite polarity passes through the other reactance coil 26. Consequently, the coil of each reactor is traversed by intermittent unidirectional current so that this current produces a premagnetization of the magnetizable reactor core.

The output circuit of the full-wave rectifier 23 is connected in parallel relation to field winding 15 and in series relation to the resistor 16. The poling of the rectifier output circuit is such that the rectified voltage impressed across the field winding 15 is always cumulative to the voltage drop caused in the field winding by the current flow between the supply buses 12 and 13. As a result, the output voltage of rectifier 23 can only strengthen the motor field thus reducing the motor speed below the above-mentioned maximum value. The magnitude of the rectified voltage thus effective, depends on the reactance of the two saturable reactors 27 and 28. This reactance is controlled to vary in dependence upon the armature current of the drive motor M. To this end, each reactor is equipped with a pattern winding 31 or 32 and with a pilot winding 35 or 36. The two control windings of each reactor are poled to oppose each other and the pattern field winding 31 or 32 of each reactor is connected to oppose the premagnetization caused by the intermittent direct current flowing through the reactance coil 25 or 26 of the same reactor. The two pattern windings 31 and 32 are connected in series with each other and in series with a calibrating resistor 33 across an adjustable portion of a voltage dividing rheostat 34 which is energized from across the constant-voltage supply buses 12 and 13. The tap of rheostat 34 is selectively adjustable over a given range in order to determine the desired value of reeling tension. The pilot windings 35 and 36 are series connected with each other across the resistor 5 of the armature circuit so that their excitation is proportional to the voltage drop of resistor 5 and hence proportional to the armature current of motor M.

During the operation of the drive, the amplifying device varies the output voltage of rectifier 23 and hence the resultant field excitation of motor M in such a manner that the differential effect of the pair of control coils in each reactor remains constant. Since this differential control effect depends upon the armature current of the motor M, the overall effect of the auxiliary amplifying device is to vary the motor field and consequently the motor speed in the sense needed to maintain a constant armature current. As a result, the angular speed of armature 4 and reel core 3 decreases as the reel diameter is building up and the horsepower output of the motor remains constant, thus securing substantially constant tension in the material being reeled.

It will be recognized that the above-described drive system has an extremely simple design and an improved economy of performance as compared with those heretofore available for similar purposes. Due to the fact that the entire control equipment, aside from the reel drive motor, is composed only of stationary and static devices, the possible sources of wear and operating defects are greatly reduced so that the maintenance requirements of the system are a minimum.

It will be understood that drive systems according to the invention can be modified as regards individual components and circuit connections without departing from the essential objectives, advantages and features of the invention. For instance, instead of providing a separate series resistor in the armature circuit, an interpole or auxiliary series winding of the motor, if such a winding is present, may be utilized. Also, while I have shown reactors of the three-legged type, other known designs and circuits of similarly operating reactance devices are applicable. It is further possible to provide the saturable reactor or reactors with feedback or self-excitation by means other than the illustrated half-wave rectifier circuits. For instance, a single saturable reactor with an alternating-current reactance winding may be used and any desired feedback or self-excitation can be achieved, in the known manner, by adding a third coil on the center leg of the reactor and energizing this coil by output voltage from rectifier 23. Such and other modifications will be apparent to those skilled in the art upon a study of this disclosure and are intended to be within the scope of the claims annexed hereto.

I claim as my invention:

1. A core-type reel drive, comprising a direct-current drive motor having an armature circuit and a field winding, adjustable-voltage supply means connected to said armature circuit for energizing it in accordance with the desired linear reeling speed, constant-voltage supply means, a resistor series-connected with said field winding across said constant-voltage supply means to provide said field winding with component constant excitation, alternating-current supply means, a rectifier and controllable saturable reactor means series-connected with each other across said alternating-current supply means and having a rectifier output circuit connected in parallel relation to said field winding and in series relation to said resistor and poled to provide said field winding with variable component excitation cumulative to said constant component excitation, said reactor means having control means connected with said armature circuit for regulating said variable component excitation in dependence upon the current in said armature circuit.

2. A core-type reel drive, comprising a direct-current drive motor having an armature circuit and a field winding, adjustable-voltage supply means connected to said armature circuit for energizing it in accordance with the desired linear reeling speed, constant voltage supply means, a resistor series-connected with said field winding across said constant-voltage supply means to provide excitation for said winding, alternating current supply means, a rectifier and saturable reactor means series-connected with each other across said alternating-circuit supply means, said rectifier having an output circuit connected across said field winding in series-relation to said resistor and poled to strengthen said excitation, said reactor means having two mutually differential control circuits, one of said control circuits being connected to said constant-voltage supply means, said other control circuit being connected with said armature circuit for controlling said reactor means in accordance with the current in said armature circuit to maintain said motor at a substantially constant horsepower value.

3. A core-type reel drive, comprising a direct-current drive motor having an armature circuit and a field winding, adjustable-voltage supply means connected to said armature circuit for energizing it in accordance with the desired linear reeling speed, constant-voltage supply means, a resistor series-connected with said field winding across said constant-voltage supply means to provide said field winding with component constant excitation, alternating-current supply means, a full-wave rectifier, two saturable reactors having respective reactance windings connected parallel to each other and in series with said full-wave rectifier across said alternating-current supply means, two half-wave rectifiers connected inversely parallel to each other and individually in series with said respective reactance windings to pass current through said reactance windings in alternate half-wave periods respectively to provide undirectional premagnetization for each reactor, said full-wave rectifier having an output circuit connected parallel to said field winding and in series with said resistor and being poled to provide said field winding with variable component excitation cumulative to said constant component excitation, said reactors having respective control circuit means connected with said armature circuit to be energized in dependence upon the current in said armature circuit for regulating said variable component field excitation for substantially constant horsepower of said motor.

4. In a core-type reel drive according to claim 3, said reactor control circuit means comprising a pair of mutually opposed premagnetizing windings in each of said reactors, a first control circuit extending in series through one winding of each pair, said first control circuit being connected with said constant-voltage supply means and having adjustable rheostat means to provide adjustable constant energization for said one winding of each pair, a second control circuit extending in series through said other windings of said respective pairs and being connected with said armature circuit for energizing said other windings in proportion to said armature current.

5. In a core-type reel drive according to claim 4, said first control circuit and said one winding of each winding pair being poled relative to said respective half-wave rectifiers so as to have the magnetization due to said one winding oppose said unidirectional premagnetization in each of said reactors.

MARTIN H. FISHER.

REFERENCES CITED

The following references are of record in the file of this patent:

UNITED STATES PATENTS

| Number | Name | Date |
|---|---|---|
| 2,012,588 | Logan | Aug. 27, 1935 |
| 2,468,557 | Huston | Apr. 26, 1949 |
| 2,504,105 | Bendz | Apr. 18, 1950 |

FOREIGN PATENTS

| Number | Country | Date |
|---|---|---|
| 397,574 | Great Britain | Aug. 31, 1933 |